July 24, 1962

R. P. SHEPHERD ET AL 3,045,721

UNDER-WING FUELING NOZZLE

Filed Feb. 4, 1960

INVENTORS.
RAYMOND P. SHEPHERD,
WALLACE D. BOONE,
BY Allen & Allen
ATTORNEYS.

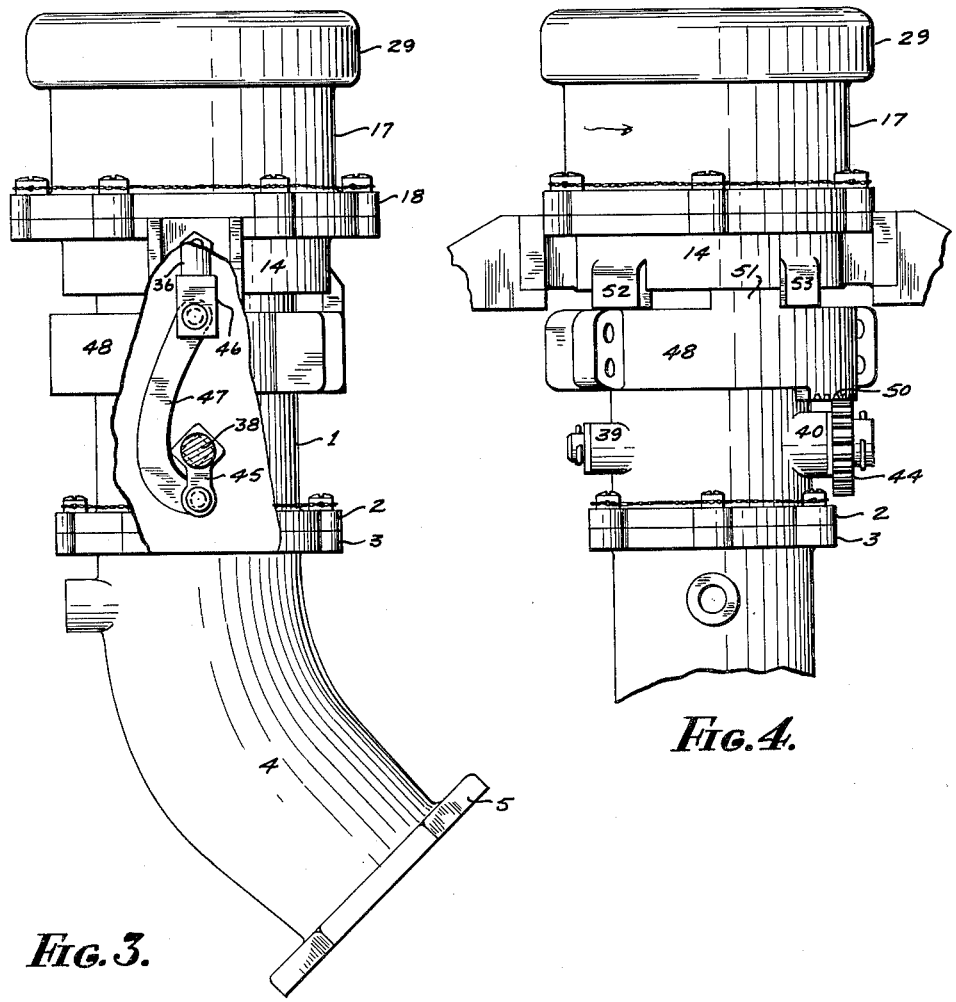
FIG. 4.
FIG. 3.
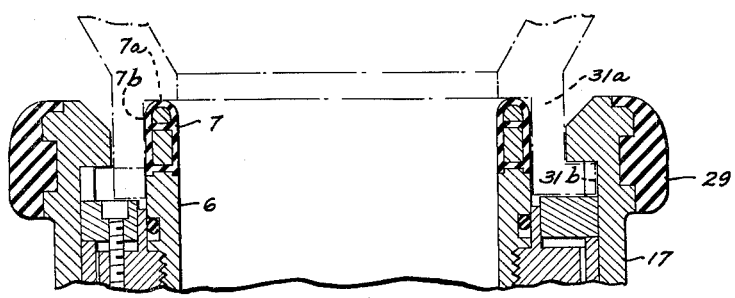
FIG. 5.
INVENTORS.
RAYMOND P. SHEPHERD,
WALLACE D. BOONE,
BY
Allen & Allen
ATTORNEYS.

3,045,721
UNDER-WING FUELING NOZZLE
Raymond P. Shepherd, Loveland, and Wallace D. Boone, Cincinnati, Ohio, assignors to Dover Corporation, a corporation of Delaware
Filed Feb. 4, 1960, Ser. No. 6,683
13 Claims. (Cl. 141—346)

The invention relates to a nozzle means such as may be connected to an opening in the underside of a fuel tank mounted in an airplane wing, so that fuel may be delivered into the tank through its bottom and without necessitating climbing over the upper side of the airplane wing. While the invention will be described in connection with this exemplary utility, it will be understood that it may be employed wherever it is desired to make a fluid tight connection between a nozzle and a fitting on a tank.

The under-wing fueling of airplane tanks is not new per se; and the skilled worker in the art will understand that the tank itself is provided with a fitting incorporating a valve and a valve seat which are normally in the closed position so as to prevent loss of the contents of the tank. The fitting is adapted for engagement with a nozzle; and the nozzle itself will contain a valve. When the nozzle and fitting are interengaged, the opening of the valve in the nozzle acts to open the valve in the fitting also, so that since the nozzle is connected to a source of supply of the fuel, the fuel will flow into the tank until such time as the nozzle valve is closed.

Hitherto, however, difficulties have been encountered in the construction and maintenance of such nozzles and in their use. It is a primary object of this invention to obviate these difficulties.

It is an object of the invention to provide an improved nose seal and nose seal assembly for nozzles of the character to which reference has been made.

It is an object of the invention to provide a type of nozzle in which the sealing and the opening of the nozzle valve is accomplished in a single operation.

It is an object of the invention to provide a structure which is positive and safe in operation despite the semi-automatic feature which has been described above.

It is an object of the invention to provide a nozzle structure in which the valve cannot be opened until the nozzle is fully engaged with the fitting and fully sealed thereto.

These and other objects of the invention which will be set forth hereinafter or will be apparent to one skilled in the art upon reading these specifications are accomplished by that construction and arrangement of parts of which the aforesaid exemplary embodiment will now be described. Reference is made to the accompanying drawings wherein:

FIG. 3 is an elevational view of the nozzle structure with a portion cut away to show interior means for the operation of the nozzle valve.

FIG. 4 is an elevational view of the nozzle showing the interconnection between the locking means and the means for operating the valve.

FIG. 5 is a partial sectional view of the upper part of the nozzle showing the coaction of the sealing element with the tank fitting, the fitting being shown in dotted lines.

Figure 1:
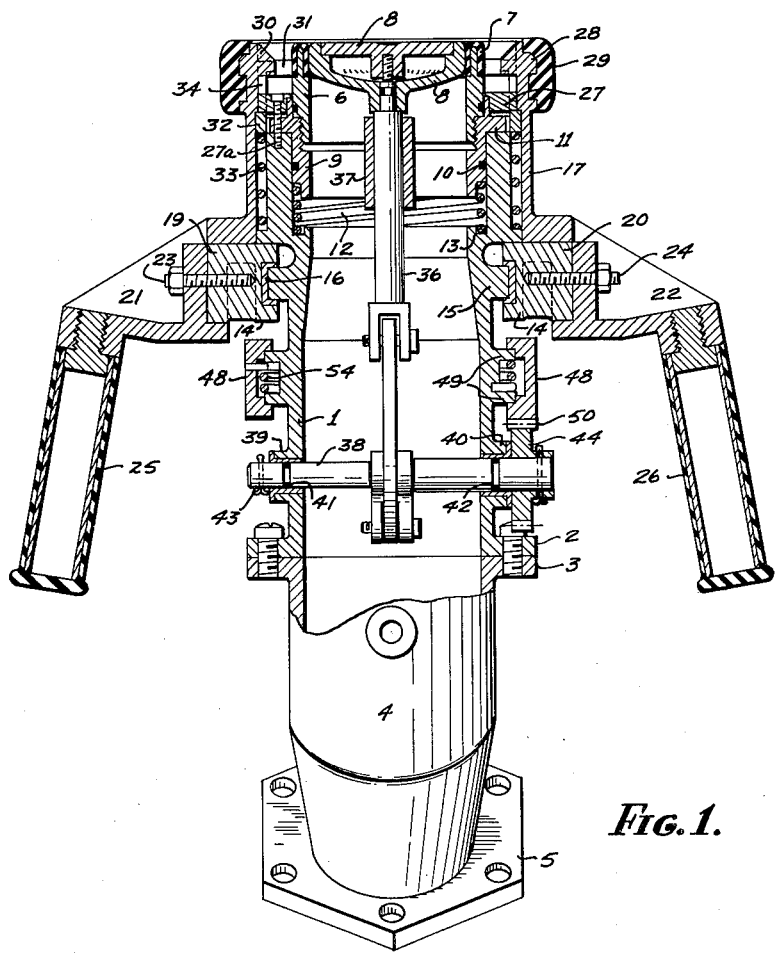
FIG. 1 is an elevational view of the nozzle of this invention with parts in section.

Referring first to FIG. 1, the nozzle comprises a hollow body 1 having at its lower end a flange 2 by means of which it may be attached to the flange 3 of a coupling member 4. This coupling member will normally be attached by means of its lower flange 5 to a fitting on a flexible conduit (not shown) leading to a source of fuel. In the under-wing fueling of airplane tanks, the source of fuel will normally be a tank provided with a pump or other means for forcing the fuel upwardly through the flexible conduit and the nozzle.

At the top of the body there is located an inner sleeve-like element 6. The upper edge of this element is covered with a sealing substance 7 in the form of an annulus, every portion of which is U-shaped in cross section so as to embrace the reduced upper edge of the sleeve 6. The sealing substance may be resilient material of either natural or synthetic types; but it should be chosen in accordance with the nature of the fuel or other liquid to be handled by the nozzle so as to be unaffected thereby. If the nozzle is to handle gasoline, for example, the sealing substance 7 may be of a synthetic plastic or rubber or of chloroprene, which will not be affected by the liquid. Preferably the sealing substance is vulcanized or hardened in a mold about the upper reduced edge of the element 6; and it is preferred to perforate the reduced edge at intervals so that the sealing substance will tie across through these holes and will be firmly affixed to the sleeve-like element. The seal 7 is effective both against the nozzle valve element 8 and against a sealing surface on the fitting forming part of the airplane fuel tank to which the nozzle will be attached.

In FIG. 5 it will be seen that the upper or rounded surface of the sealing element 7 seats against a surface 7a of the tank fitting while the outer side of the sealing element seats against a cylindrical surface 7b of the fitting. The nozzle valve, not shown in this figure, seats against the inner surface of the sealing element 7. Because the sealing element 7 is mounted on the sleeve 6 which, as hereinafter described, is movable and spring pressed, a tight seal is insured, and a slight tilting of the sleeve 6 with respect to the fitting cannot affect the tightness of the seal.

The sleeve-like element 6 is firmly attached in any suitable way to another sleeve-like element 9. It would be possible to form the elements 6 and 9 in one piece. They are formed separately and attached together as a matter of manufacturing convenience, and also to permit more economical replacement of the sleeve 6 and its sealing element if the sealing element should become worn or damaged.

It will be noted in FIG. 1 that the element 9 is sealed to the interior of the body 1 by means of gaskets or sealing rings 10. The element 9 has a shoulder 11 which overlies the top of the body 1. Also there is a spring 12 located between the lower edge of the element 9 and an upwardly directed shoulder 13 on the body 1. This spring tends to urge the elements 6 and 9 upwardly. It will be noted also that hydraulic pressure within the nozzle, acting upon the lower edge of the sleeve element 9, reinforces the action of the spring 12 tending to move the sleeves 6 and 9 upwardly.

A ring element 14 is rotatably mounted on an outwardly projecting annular rib 15 on the body of the nozzle. The mounting may be by means of an anti-friction substance 16; and it will be noted in FIG. 1 that the rotatable ring 14 is fixed in axial position with respect to the body. The anti-friction substance 16 may be nylon which is a polyamide resin made by the polymerization of a hexamethylenedimine salt of adipic acid or Teflon which is a tetrafluoroethylene polymer or other similar substances. An anti-friction mounntig of the ring 14 on the body 1 is thus obtained although both elements may be made of the same metal. While the nozzle of this invention may be made of any suitable metal, aluminum and its alloys have been found to be advantageous because of the saving in weight.

An outer sleeve element 17 has ears 18 at its lower end (FIG. 2) by means of which it may be bolted or otherwise affixed to the ring 14. At opposite sides the ring 14 has bosses 19 and 20 to which brackets 21 and 22 may be affixed respectively by bolts 23 and 24. The brackets carry downwardly depending handle elements indicated at 25 and 26 preferably covered with some frictional substance providing a hand gripping surface. Convenience in operation is furthered by mounting the handles rotatably on the brackets 21 and 22. In some structures the brackets themselves are tiltable on the bosses 19 and 20 so that the angularity of the handles may be adjusted.

Above the shoulder 11 on the element 9 there lies a washer shaped element 27 which will be more fully described hereinafter. This washer shaped element is held in place by screws, one of which is shown at 27a in FIG. 1. These screws pass through the element 27, through the shoulder 11 on the element 9, and into the body of the nozzle. It will be evident that the element 27 will limit the upward motion of the elements 6 and 9 under the influence of the spring 12. A slight spacing between the element 27 and the shoulder 11 has been shown in FIG. 1 to indicate that the combined elements 6 and 9 have a limited upward movement in the nozzle structure.

The outer sleeve 17 is prolonged upwardly as at 28 and carries an external coating of resilient substance 29 which serves as a bumper to prevent damage to the nozzle. The upper end of the sleeve 17 is also provided with an inwardly extending annulus 30 which is interrupted at intervals as will best be appreciated from FIG. 2. As shown in FIG. 5 the fitting on the lower side of the airplane fuel tank will have an annular member 31a adapted to pass between the elements 6 and 30 of the nozzle structure in the space marked 31 in FIG. 1; and the annular member on the fitting will have outwardly projecting detents 31b adapted to pass through the interruptions in the annular element 30 so as to lie therebeneath. If the outer sleeve 17 is then rotated through a small arc, the detents on the fitting will underlie the uninterrupted portions of the element 30, and the nozzle and the fitting will be locked together. As a result of this locking, the nose seal 7 will be seated against the sealing surfaces of the fitting forming part of the airplane fuel tank.

Figure 2:
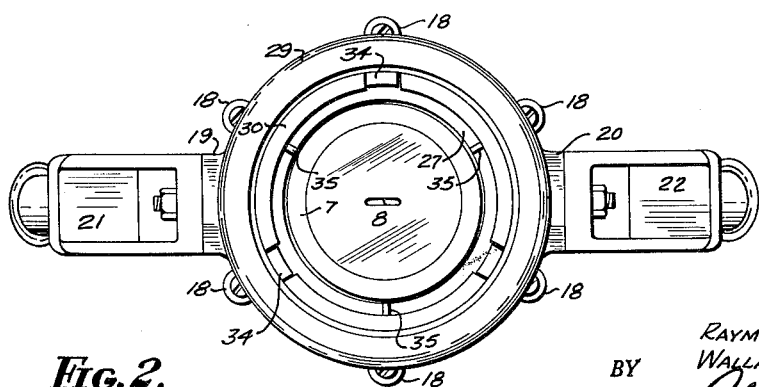
FIG. 2 is a plan view looking down on the top of the nozzle structure.

In order to prevent rotation of the external sleeve 17 of the nozzle when the nozzle is not in a relationship to the fuel tank fitting which will permit locking, use is made of a ring like element 32 which is located between the sleeve 17 and the body of the nozzle and which is urged upwardly by a compression spring 33. The element 32 carries upward extensions 34 which lie in the interruptions of the member 30 (passing through slots in the element 27) and hence normally prevent the rotation of the sleeve 17. When the nozzle is attached to the airplane tank fitting, however, the detents hereinabove described depress the upward extensions 34, bringing them out of engagement with the element 30 and thus permitting rotation of the outer sleeve 17 for locking purposes. The nozzle structure is engaged with the fitting on the airplane fuel tank by being brought thereagainst and pushed upwardly so as to depress the extensions 34 and to bring the detents below the interrupted annulus 30, whereupon the sleeve 17 may be rotated through a small arc to effect a locking engagement. The element 27, as shown in FIG. 2 is provided with certain radial upstanding ribs 35 which will enter slots in the annular member on the airplane tank fitting and act to prevent rotation of the body of the nozzle with respect to the fitting. All of the foregoing operations can be performed by means of the handles 25 and 26. The valve 8 has a stem 36 which is journaled for sliding motion in a bearing 37 which is carried on a spider attached to the element 9. A shaft 38 extends across the body 1 and is journaled in bearings 39 and 40 formed as hollow bosses on the body. The bearings are bushed as shown in the drawing; and the shaft is provided with gaskets 41 and 42 to prevent leakage of the fluid contained within the body. The shaft is shown as provided with a cotter pin 43 at one end and with a gear 44 at the other end. Thus the shaft is held against axial movement.

As best shown in FIG. 3 the shaft 38 is provided centrally with a forked lever arm 45 which is connected to a fork 46 on the lower end of the valve stem 36 by a curved link 47. This construction provides a lock for the valve 8 in the closed position as will be evident.

A rotatable ring 48 is mounted on annular projections 49 on the body 1 so as to be rotatable thereon but fixed as to its axial position. Although it is shown only for the ring 48 in FIG. 4, it will be understood that the rotatable rings 14 and 48 are formed as split rings, the two halves of which can be bolted together about the body 1 in the assembling procedure. A portion of the ring 48 is provided with gear teeth 50 which mesh with the teeth on the gear 44. It will be understood that a partial rotation of the ring 48 will turn the shaft 38 to which the gear 44 is attached thus causing the valve 8 to open upwardly. In doing so, the valve 8 will engage the valve which forms a part of the fitting on the airplane fuel tank, and will open that valve.

Referring now to FIG. 4, which shows the mechanism in valve-closed position, the rotatable ring 48 is provided with an upstanding lug 51 which lies between a pair of downwardly projecting lugs 52 and 53 on the rotatable ring 14. The width of the lug 51 is substantially less than the spacing between the lugs 52 and 53; and the arrangement is such that when the nozzle is engaged with the fitting on the airplane fuel tank as above described, and when the sleeve 17 is rotated in the direction of the arrow by means of the handles 25 and 26 so as to effect locking, the lug 52 on the ring 14 will engage the lug 51 on the ring 48 and will rotate that ring in such a way as to open the valve 8. It is desirable to place within the rotatable ring 48 a coiled torsional spring 54 which will serve to keep the lug 51 against the lug 52 when the valve is open, and which will prevent over-running of the ring 48. When the sleeve 17 is rotated in the opposite direction as at the conclusion of a filling operation, the spring 54 will cause the lug 51 to follow the lug 52 so as to tend to close the nozzle valve prior to the unlocking of the nozzle from the tank fitting. However, positive closure of the valve is insured by the lug 53. When the valve 8 has been closed, there will be some further rotation of the members so as to effect the valve locking action hereinabove described, which will prevent further turning of the rotatable ring 48, but which will effect unlocking of the nozzle from the tank fitting. The placement of the lug 53 is such that it will engage the lug 51 and prevent over-running of the rotatable ring 14 beyond the unlocking position.

It will be seen from the structure above described that the engagement of the nozzle with and the locking of the nozzle to the fitting on the underside of the airplane fuel tank is readily accomplished by means of the handles 25 and 26 and that a further rotation of the sleeve 17 by means of these handles serves to open the valve. But the outer sleeve 17 cannot be rotated until full engagement of the nozzle with the fuel tank fitting has been accomplished, and the locking of the nozzle to the fitting will occur prior to the opening of the valve. By the same token the valve necessarily closes before the nozzle can be unlocked and disengaged from the fuel tank fitting. Upon the closure of the nozzle valve, the fuel tank fitting valve (being spring pressed) will close also, eliminating any spillage of the fuel. When not in engagement with a fuel tank fitting, the nozzle of this invention may readily be carried by one or both of the handles 25 and 26. The valve 8 cannot be opened when the nozzle is out of engagement with the fitting, because the extensions 34 will have entered the interstices in the annulus 30, preventing any rotation of the sleeve.

Modifications may be made in the invention without departing from the spirit of it. The invention having been described in an exemplary embodiment what is claimed as new and desired to be secured by Letters Patent is:

1. In a nozzle usable for the purposes described, a hollow body, means at the top of said body presenting a resilient sealing surface of multi-planar form, part of which surface may be brought into sealing contact with a fitting on a tank, a first sleeve means of lesser length than said body and rotatable on said body for locking said nozzle to the fitting, handle means thereon for rotating said first sleeve, a valve adapted to make sealing contact with another portion of the sealing surface of said first mentioned means, means mounted on said body for operating said valve so as to move it away from said sealing surface means, and a connection between said valve operating means and said first sleeve whereby movement of said sleeve during a portion of its rotation will move said valve.

2. The structure claimed in claim 1 wherein the means at the top of said body is a second sleeve having a reduced upper edge, said sealing surfaces being provided by an annulus of resilient sealing substance every part of which is U-shaped in cross section, the reduced upper edge of said second sleeve being embraced between the legs of said U-shaped section.

3. The structure claimed in claim 2 including means for mounting said second sleeve within said body with limited axial movement, and spring means for urging said last mentioned means in an outward direction.

4. The structure claimed in claim 2 including means for mounting said second sleeve within said body with limited axial movement, and spring means for urging said second sleeve in an outward direction, said means for mounting said second sleeve within said body comprising the provision of a surface in connection with said second sleeve, which surface is open to hydraulic pressure within said hollow body, whereby said hydraulic pressure reinforces the action of said spring.

5. The structure claimed in claim 3 wherein said first sleeve means is attached to a first ring, said first sleeve means and said first ring being rotatable on said body but fixed against axial movement, and wherein the means for operating said valve includes a second ring rotatably mounted on said body and fixed as to axial position, there being a lost motion connection between said rings.

6. The structure claimed in claim 5 including spring means within said second ring urging said ring in a direction to close said valve.

7. The structure claimed in claim 6 wherein a shaft is mounted transversely of said body, wherein said valve means has a stem, a lever arm on said shaft within said body, a link connecting said stem with said lever arm, wherein said shaft bears a gear externally of said body, and wherein said second ring is provided with teeth meshing with the teeth of said gear.

8. The structure claimed in claim 7 including means for preventing rotation of said first sleeve excepting when said nozzle is engaged with the fitting.

9. In a nozzle for the purposes described, a hollow body, a sleeve assembly slidable within the upper end of said hollow body, the upper end of said sleeve assembly being covered across its top and downwardly over a portion of its inner and outer surfaces with resilient sealing means, said sleeve assembly having an outwardly projecting shoulder overlying the top of said body, spring means within said body tending to urge said sleeve assembly outwardly, and means to limit the outward movement of said sleeve assembly, said limiting means comprising a washer shaped element lying above said shoulder and fastened to said body by fastening means passing through said shoulder and allowing limited outward movement of said sleeve assembly.

10. The structure claimed in claim 5 wherein the said lost motion connection between said first and second mentioned ring members comprises a lug on one of said members and spaced coacting lugs on the other of said members.

11. The structure claimed in claim 9 including a ring journaled externally of said body, handle means attached to said ring, an external sleeve member attached to said ring and covering the upper end of said body, said sleeve assembly and said washer shaped element, the upper end of said external sleeve member having an inwardly projecting interrupted annulus adapted upon rotation of said external sleeve member to effect locking engagement with a portion of a fitting on a tank which portion is a circular flange portion adapted to lie between said external sleeve member and said internal sleeve assembly with outwardly projecting detents engaging beneath said interrupted annulus, and with said circular flange portion lying in sealing contact with said resilient sealing means, means for preventing the rotation of said external sleeve member with respect to said body when said nozzle is out of engagement with said fitting, means comprising a ring element located between said body and said external sleeve member and urged outwardly by a spring, and outward extensions on said ring element extending through slots in said washer shaped element and normally lying within the interruptions of said annulus but adapted to be depressed therebelow by the said detents.

12. The structure claimed in claim 11 wherein the upper part of said external sleeve member has a covering of resilient material acting as a bumper.

13. The structure claimed in claim 7 wherein said link is non-rectilinear and wherein the lever arm on said shaft passes dead center when the valve is seated whereby to lock said valves in closed position.

References Cited in the file of this patent

UNITED STATES PATENTS

| | | |
|---|---|---|
| 2,437,589 | Bink | Mar. 9, 1948 |
| 2,653,832 | Carter | Sept. 29, 1953 |
| 2,729,471 | Fraser | Jan. 3, 1956 |
| 2,737,401 | Lindsay | Mar. 6, 1956 |
| 2,836,207 | Griswold | May 27, 1958 |

FOREIGN PATENTS

| | | |
|---|---|---|
| 858,617 | Germany | Dec. 8, 1952 |